United States Patent
Varoglu et al.

(10) Patent No.: US 8,918,822 B2
(45) Date of Patent: Dec. 23, 2014

(54) DISPLAYING A SYNCHRONIZED INSTANCE OF CONTENT ON A PORTABLE ELECTRONIC DEVICE

(71) Applicant: Apple Inc., Cupertino, CA (US)

(72) Inventors: Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 13/627,954

(22) Filed: Sep. 26, 2012

(65) Prior Publication Data

US 2014/0089992 A1    Mar. 27, 2014

(51) Int. Cl.
*H04N 7/173*    (2011.01)
*H04N 7/16*    (2011.01)

(52) U.S. Cl.
USPC ............................................ 725/93; 725/141

(58) Field of Classification Search
CPC combination set(s) only.
See application file for complete search history.

(56) References Cited

U.S. PATENT DOCUMENTS

| | | | | |
|---|---|---|---|---|
| 7,344,084 | B2* | 3/2008 | DaCosta | 235/472.01 |
| 8,204,485 | B2* | 6/2012 | LeBlanc et al. | 455/412.2 |
| 2003/0018748 | A1 | 1/2003 | McKenna, Jr. | |
| 2008/0196071 | A1 | 8/2008 | Manthoulis | |
| 2010/0303159 | A1* | 12/2010 | Schultz et al. | 375/240.28 |
| 2011/0321096 | A1 | 12/2011 | Landow et al. | |
| 2012/0150903 | A1 | 6/2012 | Davis et al. | |

* cited by examiner

*Primary Examiner* — Mark D Featherstone
(74) *Attorney, Agent, or Firm* — Park, Vaughan, Fleming & Dowler LLP; A. Richard Park (57) ABSTRACT

A method and system are described for displaying a synchronized instance of content on a portable electronic device. In the described embodiments, a selection of streaming content that is being displayed on a fixed display system is received by the portable electronic device. The portable electronic device then determines if the portable electronic device is compatible with the streaming content being received by the fixed display system. If the portable electronic device is compatible with the streaming content being received by the fixed display system, then the portable electronic device requests the synchronized instance of the streaming content and displays it.

26 Claims, 7 Drawing Sheets

DISPLAYING A SYNCHRONIZED INSTANCE OF CONTENT ON A PORTABLE ELECTRONIC DEVICE

BACKGROUND

1. Field

The described embodiments relate to displaying content on a portable electronic device. More specifically, the described embodiments relate to displaying a synchronized instance of content on a portable electronic device.

2. Related Art

When a group of people gather to watch a television program or a movie at home, at some point during the viewing someone may chose to temporarily leave the viewing area (e.g., to prepare food). Often, when someone leaves the viewing area during the presentation, the remaining viewers may decide to either stop the showing (e.g., pause it) and wait for the person to return, or let the presentation continue so that the person leaving the viewing area misses some of the show. Each choice has undesirable consequences that may result in an unsatisfactory user experience.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a portable electronic device and/or fixed display system with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to one or more application-specific integrated circuit (ASIC) chips, field-programmable gate arrays (FPGAs), other programmable-logic devices, dedicated logic devices, and microcontrollers. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When a device (e.g., a portable electronic device or fixed display system) with computing capabilities reads and executes the code and/or data stored on the computer-readable storage medium, the device performs the methods and processes embodied as data structures and code and stored within the computer-readable storage medium. For example, in some embodiments, a processing subsystem can read the code and/or data from a memory subsystem that comprises a computer-readable storage medium and can execute code and/or use the data to perform the methods and processes.

In the following description, we refer to "some embodiments." Note that "some embodiments" describes a subset of all of the possible embodiments, but does not always specify the same subset of embodiments.

Overview

The described embodiments perform operations for displaying, on a portable electronic device, a synchronized instance of the content that is being displayed on a fixed display system. In described embodiments, the portable electronic device can include any portable electronic device that can receive and display a content stream, including but not limited to a smartphone, a tablet computer, a laptop computer or a netbook computer. A fixed display system may be a device such as a set-top box, network-enabled DVD player, an Apple TV, a Google TV, a Roku Streaming Player, a digital video recorder (DVR), a video game console (such as an Xbox 360), a network-enabled digital video disk (DVD) player, and/or any other device that is capable of receiving streaming content and communicating the streaming content to a separate display device (such as a television set or monitor) for display. In such an instance, the fixed display system may be connected (via a wired or wireless connection) to the separate display device. As another example, a fixed display system may be a device such as a network-enabled television that itself includes both (a) a display screen (such as an LCD screen) and (b) components for receiving streaming content and displaying the content on the display screen. Note that in each case the fixed display system is generally not meant to be picked-up and moved (e.g., other than to adjust the display for viewing) while streaming content is actively displayed.

During operation, a group of people may sit in a room with the fixed display system and begin watching a movie or other content. Then, during the viewing when someone decides to leave the room (e.g., to prepare a snack), the other viewers must either pause the viewing while they all wait for the departed viewer to return, or let the presentation continue and the returning viewer may miss some of the presentation.

In described embodiments, when a viewer decides to leave the viewing area, the viewer uses a portable electronic device (e.g., a smartphone or tablet computer) to find the content stream currently being viewed. Note that in some embodiments, the portable electronic device may be configured so that it searches for and finds available content streams in the background and has them ready for presentation to a user when prompted, without having to begin a search only when the user prompts it. For example, the portable electronic device may determine which content streams are currently being displayed and accessible to the portable electronic device using a service discovery protocol.

The viewer then selects the content stream and the portable electronic device requests information about the content stream from the fixed display system. The fixed display system then responds with information about the content stream. The information may include, but is not limited to, the source of the content stream (e.g., Netflix), the name of the content (e.g., a unique identifier for the movie being played), and a timestamp related to the current position in the content stream. Note that in some embodiments, the portable electronic device may use a service discovery protocol to obtain some or all of the information about the content stream prior to the selection of the content stream by the user.

The portable electronic device receives the selection of the content stream from the user and determines if it can access a synchronized version of the content stream directly from the source (e.g., Netflix). This process may involve steps such as determining if the portable device has (or has access to) any applications or other software that may be required to play the content, checking connectivity to the Internet, and determining if the portable electronic device has access to a valid user account to access the content. Then, if the portable electronic device determines that it can play the content stream, it requests a synchronized content stream from the content source.

If the portable electronic device determines that it cannot request and receive the synchronized content stream from the content source (e.g., Netflix), for example, because the user does not have a Netflix account or the portable electronic device does not have the necessary application(s), then the portable electronic device may request a synchronized instance of the content stream from the fixed display system based on mirroring. When requesting the synchronized mirrored instance of content stream from the fixed display system, the portable electronic device may also notify the fixed display system of the resolution of the display on the portable electronic device. The fixed display system then generates a mirror image of the content stream being displayed on the fixed display and begins streaming the mirrored content stream to the portable electronic device.

Portable Electronic Device

Figure 1:
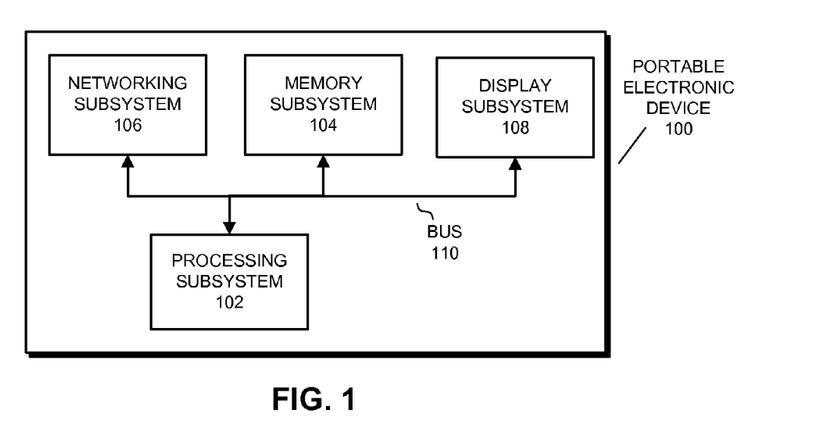
FIG. 1 presents a block diagram illustrating a portable electronic device in accordance with described embodiments.

FIG. 1 presents a block diagram illustrating portable electronic device 100 in accordance with described embodiments. Portable electronic device 100 includes processing subsystem 102, memory subsystem 104, networking subsystem 106, and display subsystem 108 all coupled together and communicating through bus 110.

Processing subsystem 102 includes one or more devices configured to perform computational operations. For example, processing subsystem 102 can include one or more microprocessors, application-specific integrated circuits (ASICs), microcontrollers, and/or programmable-logic devices.

Memory subsystem 104 includes one or more devices for storing data and/or instructions for processing subsystem 102, networking subsystem 106, and display subsystem 108. For example, memory subsystem 104 can include any type of computer-readable storage medium such as dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in portable electronic device 100. In some of these embodiments, one or more of the caches is located in processing subsystem 102 and/or display subsystem 108.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by portable electronic device 100 as fast-access storage for often-used data, while the mass-storage device is used to store less frequently used data.

Networking subsystem 106 includes one or more devices configured to couple to and communicate on a wired and/or wireless network (i.e., to perform network operations). For example, networking subsystem 106 can include a Bluetooth™ networking system, a cellular networking system (e.g., a 3G/4G network such as UMTS, LTE, etc.), a universal serial bus (USB) networking system, a Wi-Fi networking system, a networking system based on the standards described in IEEE 802.11, an Ethernet networking system, and/or another networking system. Networking subsystem 106 includes processors, controllers, radios/antennas, sockets/plugs, and/or other devices used for coupling to, communicating on, and handling data and events for each supported networking system.

Display subsystem 108 includes one or more devices for outputting visual information. For example, display subsystem 108 can include any type of display technology such as light emitting diode (LED), organic light emitting diode (OLED), liquid crystal display (LCD) (such as thin film transistor (TFT), and/or other types of display technology. In addition, display subsystem 108 can include mechanisms for controlling processing data, and/or other information for display. Note that in some embodiments, display subsystem 108 may also include an audio subsystem for producing sound, for example for use in conjunction with a visual display (e.g., for the audio portion of a video being displayed on display subsystem 108). In some embodiments, one or more memory caches and/or processing systems or other hardware modules are located in display subsystem 108.

Processing subsystem 102, memory subsystem 104, networking subsystem 106, and display subsystem 108 are coupled together using bus 110. Bus 110 is an electrical, optical, or electro-optical connection that the subsystems can use to communicate commands and data among one another. Although only one bus 110 is shown for clarity, different embodiments can include a different number or configuration of electrical, optical, or electro-optical connections among the subsystems.

Although shown as separate subsystems in FIG. 1, in some embodiments, some or all of a given subsystem can be integrated into one or more of the other subsystems in portable electronic device 100. Although alternative embodiments can be configured in this way, for clarity we describe the subsystems separately.

Portable electronic device 100 can be (or can be included in) any device with at least one display subsystem and one networking subsystem. For example, portable electronic device 100 can be (or can be included in) a laptop computer, a media player, a subnotebook/netbook, a tablet computer, a cellular phone, a personal digital assistant (PDA), a smartphone, a toy, a controller, or another portable device.

Although we use specific subsystems to describe portable electronic device 100, in alternative embodiments, different subsystems may be present in portable electronic device 100. For example, portable electronic device 100 may include one or more additional processing subsystems 102, memory subsystems 104, networking subsystems 106, and/or display subsystems 108. Additionally, one or more of the subsystems may not be present in portable electronic device 100. Moreover, in some embodiments, portable electronic device 100 may include one or more additional subsystems that are not shown in FIG. 1. For example, portable electronic device 100 may also include, without limitation, a data collection subsystem, an alarm subsystem, an audio subsystem, and/or an input/output (I/O) subsystem.

Fixed Display System

Figure 2:
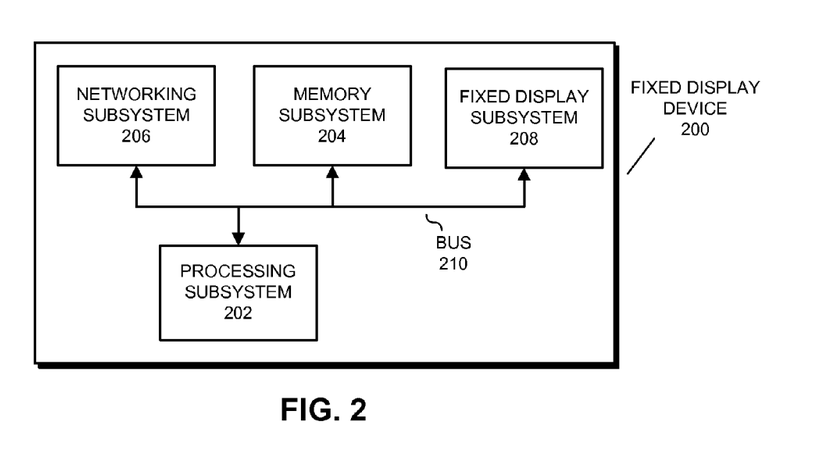
FIG. 2 presents a block diagram illustrating a fixed display system in accordance with described embodiments.

FIG. 2 presents a block diagram illustrating fixed display system 200 in accordance with described embodiments. Fixed display system 200 includes processing subsystem 202, memory subsystem 204, networking subsystem 206, and fixed display subsystem 208 all coupled together and communicating through bus 210.

Processing subsystem 202 includes one or more devices configured to perform computational operations. For example, processing subsystem 202 can include one or more microprocessors, application-specific integrated circuits (ASICs), microcontrollers, and/or programmable-logic devices.

Memory subsystem 204 includes one or more devices for storing data and/or instructions for processing subsystem 202, networking subsystem 206, and fixed display subsystem 208. For example, memory subsystem 204 can include any type of computer-readable storage medium such as dynamic random access memory (DRAM), static random access memory (SRAM), and/or other types of memory. In addition, memory subsystem 204 can include mechanisms for controlling access to the memory. In some embodiments, memory subsystem 204 includes a memory hierarchy that comprises one or more caches coupled to a memory in fixed display system 200. In some of these embodiments, one or more of the caches is located in processing subsystem 202 and/or fixed display subsystem 208.

In some embodiments, memory subsystem 204 is coupled to one or more high-capacity mass-storage devices (not shown). For example, memory subsystem 204 can be coupled to a magnetic or optical drive, a solid-state drive, or another type of mass-storage device. In these embodiments, memory subsystem 204 can be used by fixed display system 200 as fast-access storage for often-used data, while the mass-storage device is used to store less frequently used data.

Networking subsystem 206 includes one or more devices configured to couple to and communicate on a wired and/or wireless network (i.e., to perform network operations). For example, networking subsystem 206 can include a Bluetooth™ networking system, a cellular networking system (e.g., a 3G/4G network such as UMTS, LTE, etc.), a universal serial bus (USB) networking system, a Wi-Fi networking system, a networking system based on the standards described in IEEE 802.11, an Ethernet networking system, and/or another networking system. Networking subsystem 206 includes processors, controllers, radios/antennas, sockets/plugs, and/or other devices used for coupling to, communicating on, and handling data and events for each supported networking system.

Fixed display subsystem 208 includes one or more devices for outputting visual information. For example, fixed display subsystem 208 can include any type of fixed display implemented in any technology such as light emitting diode (LED), organic light emitting diode (OLED), liquid crystal display (LCD) (such as thin film transistor (TFT), cathode ray tube (CRT) and/or other types of display technology. Note that a fixed display need not be mechanically, electrically or otherwise fixed in one position, but is a display that is ordinarily not picked-up and moved (other than to adjust for viewing) while actively playing content. Examples of fixed displays include, but are not limited to, a flat screen television, a desktop computer monitor, a projection television or theatre system, and display systems that are built into furniture or otherwise affixed or mounted to a wall or other fixture.

Additionally, fixed display subsystem 208 can include mechanisms for processing data, and/or other information for display. Fixed display subsystem 208 may also include an audio subsystem for producing sound, for example, for use in conjunction with a visual display (e.g., for the audio portion of a video being displayed on fixed display subsystem 208). In some embodiments, one or more memory caches and/or processing systems or other hardware modules are located in fixed display subsystem 208.

Processing subsystem 202, memory subsystem 204, networking subsystem 206, and fixed display subsystem 208 are coupled together using bus 210. Bus 210 is an electrical, optical, or electro-optical connection that the subsystems can use to communicate commands and data among one another. Although only one bus 210 is shown for clarity, different embodiments can include a different number or configuration of electrical, optical, or electro-optical connections among the subsystems.

Although shown as separate subsystems in FIG. 2, in some embodiments, some or all of a given subsystem can be integrated into one or more of the other subsystems in fixed display system 200. Although alternative embodiments can be configured in this way, for clarity we describe the subsystems separately.

Although we use specific subsystems to describe fixed display system 200, in alternative embodiments, different subsystems may be present in fixed display system 200. For example, fixed display system 200 may include one or more additional processing subsystems 202, memory subsystems 204, networking subsystems 206, and/or fixed display subsystems 208. Additionally, one or more of the subsystems may not be present in fixed display system 200. Moreover, in some embodiments, fixed display system 200 may include one or more additional subsystems that are not shown in FIG. 2.

Additionally, in some embodiments, some or all of the subsystems in fixed display system 200 may be implemented in physically separated devices that communicate with each other using networking subsystems similar to networking subsystem 206. For example, in some embodiments, a processing subsystem, memory subsystem and networking subsystem may be located in one device (e.g., an Apple TV device, a desktop computer, a game console, a media player, or any other device that can receive streaming content and transmit it for display on a fixed display subsystem) which is connected (e.g., by a universal serial bus (USB) cable, high-definition multimedia interface (HDMI) cable, or other wired or wireless connection) to another separate display device (e.g., a flat screen television) that includes its own processing subsystem, memory subsystem, networking subsystem and a fixed display subsystem (e.g., that includes the flat screen display screen).

Operating System

Figure 3:
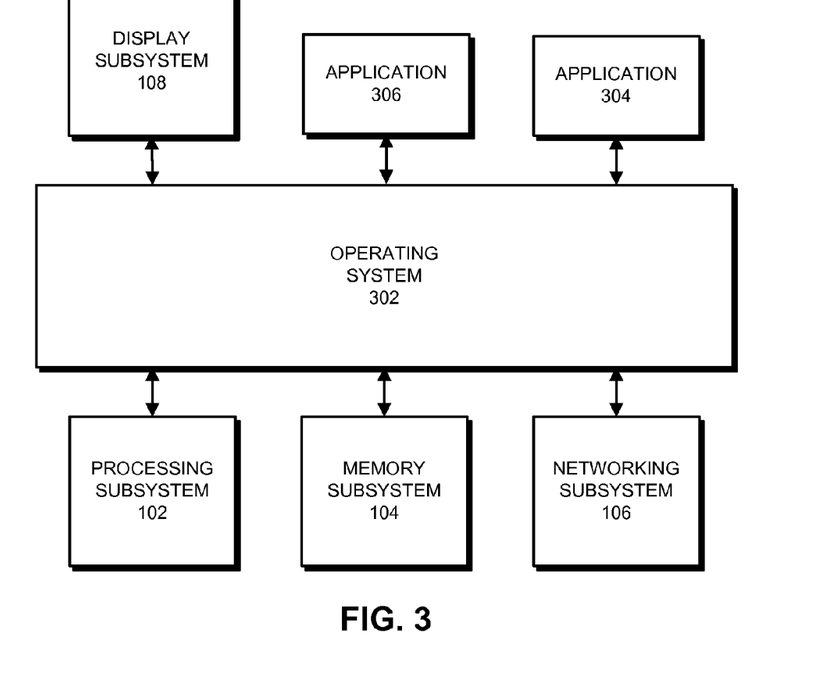
FIG. 3 presents a block diagram illustrating an operating system, an application and subsystems of a portable electronic device in accordance with described embodiments.

FIG. 3 presents a block diagram illustrating operating system 302 in accordance with the described embodiments. In some embodiments, operating system 302 is stored (as program code) in memory subsystem 104 and executed by processing subsystem 102.

Generally, operating system 302 serves as an intermediary between system hardware in portable electronic device 100 (e.g., subsystems 102-108) and applications executed by processing subsystem 102, such as applications 304-306 (which can be, for example, an email application, a web browser, a game application, and a streaming content application). For example, operating system 302 can be, but is not limited to, the iOS operating system or OS X operating system, both from Apple Inc. of Cupertino, Calif.; Windows Phone from Microsoft Corporation; Android from the Open Handset Alliance; the FreeBSD operating system from The FreeBSD Foundation of Boulder, Colo.; or another operating system. Operating systems and their general functions are known in the art and hence are not described in detail.

To manage the transfer of packets to and from applications in portable electronic device 100 using an appropriate interface in networking subsystem 106, operating system 302 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stack are known in the art and hence are not described in detail.

Network Environment

Figure 4:
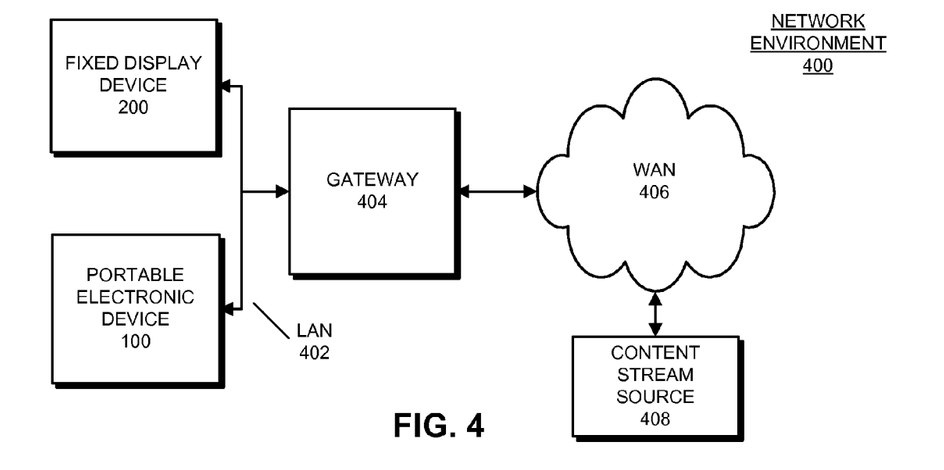
FIG. 4 presents a block diagram illustrating a network environment including a local area network and a wide area network (WAN) in accordance with described embodiments.

FIG. 4 presents a block diagram illustrating a network environment including a local area network (LAN) and a wide area network (WAN) in accordance with described embodiments. In network environment 400, portable electronic device 100, fixed display system 200 and gateway 404 communicate using LAN 402, and gateway 404 and content stream source 408 are connected through WAN 406.

LAN 402 may be any local area network implemented using any technology and any set of one or more protocols. For example, LAN 402 may include a local area network using a combination of wired and wireless infrastructure implementing Ethernet standards and wireless standards such as those found in the IEEE 802.11 standards, or any other standard or combination of standards that may be used on a LAN.

Gateway 404 is a gateway between LAN 402 and WAN 406. Gateway 404 may also include a router and other functionality to support LAN 402 and its connection to WAN 406 (e.g., a modem to connect to WAN 406). WAN 406 may be any wide area network such as the Internet and/or a cellular network system (e.g., a 3G/4G network such as UMTS, LTE, etc.) or any combination of WANs. Content stream source 408 can be any source of content that can stream the content through WAN 406, gateway 404 and LAN 402 to fixed display system 200 for display on fixed display subsystem 208. Examples of content stream source 408 include but are not limited to Netflix, and iCloud from Apple Inc. For example, the content stream from content stream source 408 may first pass through WAN 406 (e.g., the Internet) to a cellular networking system (e.g., a 4G network) to a smartphone (e.g., an iPhone) which acts as gateway 404 and implements a personal hotspot (e.g., using the 802.11 standard) and transmits the content stream to fixed display system 200 (e.g., an Apple TV device connected to a flat screen TV by a USB cable).

Displaying Synchronized Instance of Content

Figure 5:
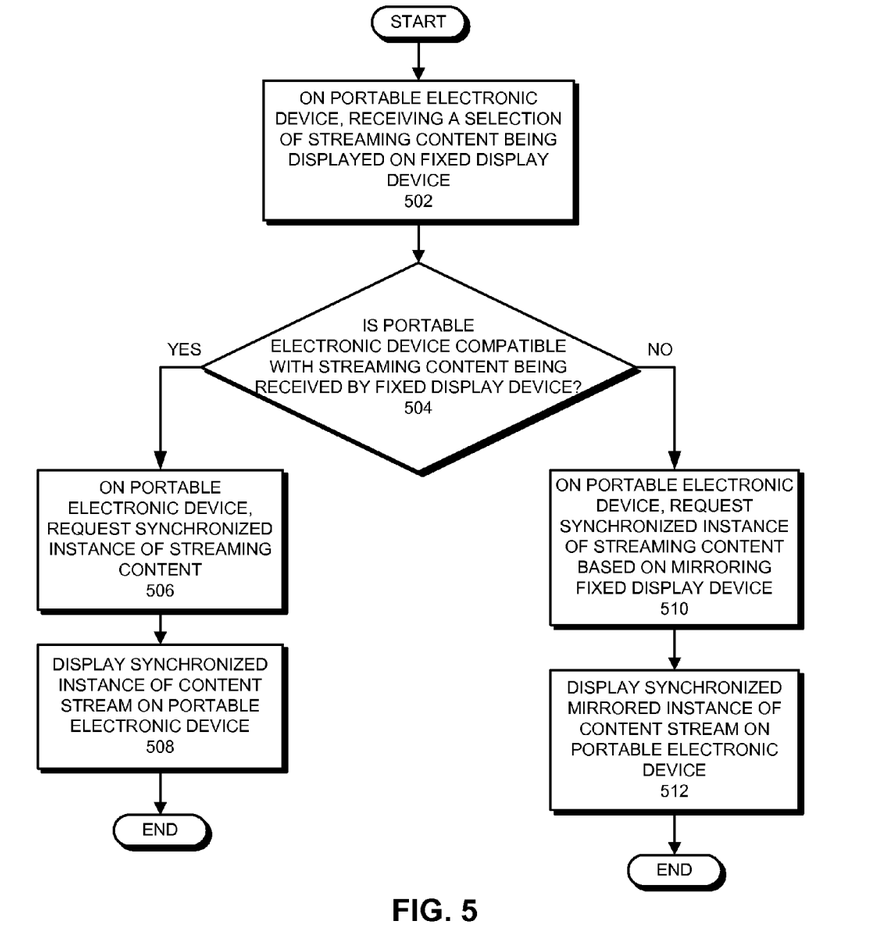
FIG. 5 presents a flowchart illustrating a process for displaying a synchronized instance of content on a portable electronic device in accordance with described embodiments.

FIG. 5 presents a flowchart illustrating a process displaying a synchronized instance of content on a portable electronic device in accordance with described embodiments. The operations shown in FIG. 5 are performed by a portable electronic device, such as portable electronic device 100 and a fixed display system, such as fixed display system 200 operating in a network environment such as network environment 400. The process displayed in FIG. 5 will be discussed with reference to FIGS. 6-12 below.

Figure 6:
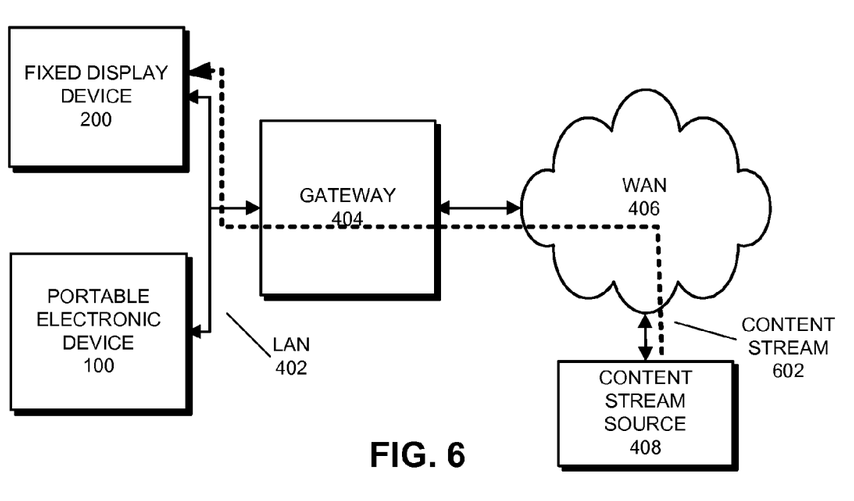
FIG. 6 presents a block diagram illustrating a network environment depicting a content stream from a source through a WAN and a local area network to a fixed display system in accordance with described embodiments.

FIG. 6 illustrates a network environment similar to network environment 400, in which content stream 602 from content stream source 408 is transmitted through WAN 406, gateway 404 and LAN 402 to fixed display system 200 in accordance with described embodiments. For example, a user may be watching a movie that is streaming from Netflix (content stream source 408) through the Internet (WAN 406) to a wireless residential gateway that includes a modem, router and wireless access point (gateway 404) to a wireless home network (LAN 402) to an Apple TV device connected to a flat screen TV (fixed display system 200 including fixed display subsystem 208).

The process of FIG. 5 may begin when a user desires to leave the room in which the fixed display subsystem (e.g., the flat screen TV) is located. Using portable electronic device 100, the user selects the content stream being displayed on fixed display system 200. Note that portable electronic device 100 may determine which content streams are available for selection on portable electronic device 100 using a service discovery protocol. For example, each fixed display system (including fixed display system 200) capable of announcing the content stream it is receiving may register the content stream as available for portable electronic device 100. In some embodiments, portable electronic device 100 may use a service discovery protocol to poll fixed display systems (including fixed display system 200) on LAN 402 to determine which ones have available content streams. The user then selects content stream 602.

When portable electronic device 100 receives the selection of content stream 602 (step 502), portable electronic device 100 determines if it is compatible with the content stream (step 504). For example, in some embodiments, as part of the service discovery protocol, fixed display system 200 includes information about which applications and permissions are required to receive content stream 602, and fixed display system 200 may also include information related to the content being played (e.g., a unique identifier for the content), the current progress (e.g., how much of the movie has elapsed), the current time and/or a unique identifier for content stream 602 (e.g., that allows content stream source 408 to uniquely identify content stream 602).

For example, if content stream source 408 requires a user account or other permission in order to be able to stream content (e.g., a Netflix account) and content stream 602 requires an application (e.g., application 304 in FIG. 3 which may be a Netflix app) in order to be displayed on portable electronic device 100, then portable electronic device 100 determines if it has all of the requirements (e.g., accounts/authorization, application). In some embodiments, if at step 502 portable electronic device 100 does not know the requirements, portable electronic device 100 may send a query to fixed display system 200 to determine the requirements (and/or additionally to retrieve information related to the content ID and current progress of the content and/or a content stream ID that identifies content stream 602). Portable electronic device 100 may also, if necessary, ask the user for information related to any required accounts and authorizations (e.g., determine if the user has an account, and/or ask for a username and/or password if they are not otherwise available to portable electronic device 100).

Figure 7:
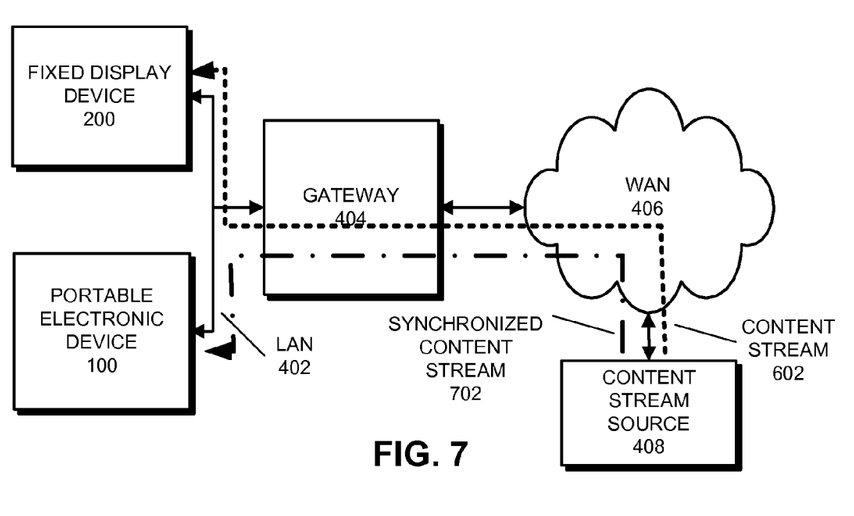
FIG. 7 presents a block diagram illustrating a network environment depicting a content stream and a synchronized content stream, each streaming from a source through a WAN and a local area network to, respectively, a fixed display system and a portable electronic device in accordance with described embodiments.

At step 504, if portable electronic device 100 determines that it is compatible with content stream 602 (e.g., meets all of the requirements necessary to be able to request, receive and display a synchronized content stream from content stream source 408), then the process continues to step 506. At step 506, portable electronic device 100 sends a request to content stream source 408 that includes the information required to request a synchronized content stream. In some embodiments, the information may include the content ID, current progress and any required permission and requests a synchronized content stream. In some embodiments, the information may include a content stream ID that identifies content stream 602 to content stream source 408 so that a synchronized content stream can be generated. FIG. 7 presents a block diagram illustrating a network environment depicting content stream 602 and synchronized content stream 702, each streaming from content stream source 408 through WAN 406, gateway 404, and LAN 402 to portable electronic device 100.

At step 508 the synchronized content stream is displayed on portable electronic device 100. Note that in some embodiments, the initial synchronization of synchronized content stream 702 is based on the information from fixed display system 200 about the content progress of content stream 602. Portable electronic device 100 may request the content progress from fixed display system 200 just prior to sending the request to content stream source 408. Also, in some embodiments, portable electronic device 100 may continue to request content synchronization information from fixed display system 200 even after beginning to display synchronized content stream 702 in order to ensure that synchronized content stream 702 maintains synchronization with content stream 602 (e.g., so the two streams do not become unsynchronized by varying transmission delays or because, for example, users of fixed display system 200 pause, rewind or otherwise modify the normal stream rate of content stream 602).

In some embodiments, when fixed display system 200 is informed by portable electronic device 100 that it has requested synchronized content stream 702, fixed display system 200 may periodically send synchronization information to portable electronic device 100 to help ensure synchronization. In some embodiments the synchronization of content stream 602 and synchronized content stream 702 may occur at content stream source 408. For example, when portable electronic device 100 requests synchronized content stream 702 from content stream source 408, it may inform content stream source 408 that the requested stream is a synchronized content stream and that it should maintain synchronization with content stream 602.

Returning to FIG. 5, at step 504 if portable electronic device 100 determines that it is not compatible with content stream 602 (e.g., it does not have the necessary permission or application(s) to receive and view synchronized content stream 702 from content stream source 408, then the process continues to step 510. At step 510, portable electronic device 100 requests a synchronized instance of content stream 602 based on mirroring fixed display system 200 as depicted in FIG. 8.

Figure 8:
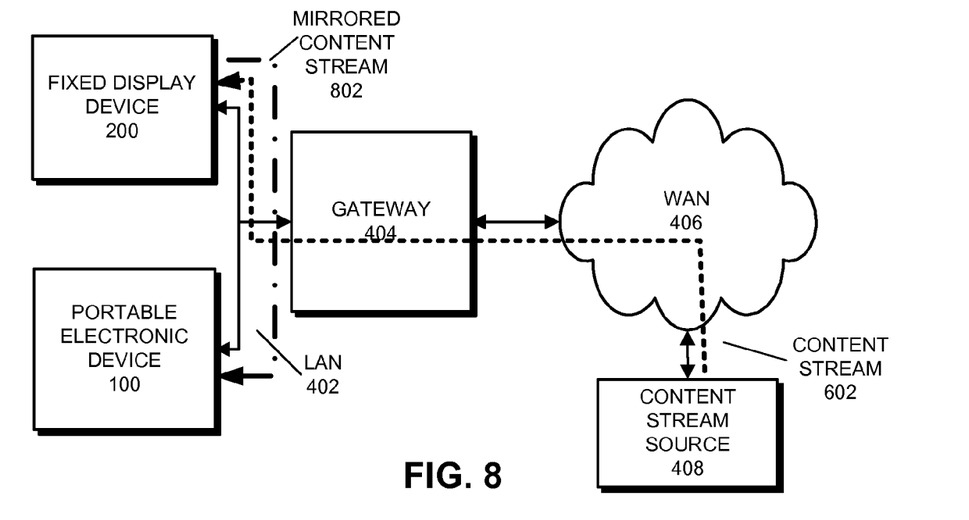
FIG. 8 presents a block diagram illustrating a network environment depicting a content stream streaming from a source through the Internet and a local area network to a fixed display system and synchronized mirrored content stream streaming from the fixed display system to the portable electronic device through the local area network in accordance with described embodiments.

FIG. 8 presents a block diagram illustrating a network environment similar to network environment 400 in which content stream 602 is streaming from content stream source 408 through WAN 406, gateway 404 and LAN 402 to fixed display system 200. Fixed display system 200 then generates a synchronized content stream, mirrored content stream 802, based on mirroring content stream 602. Content stream 602 may be mirrored based on replicating the display information being used to display content stream 602 on fixed display subsystem 208. The mirrored content stream may also be scaled by fixed display system 200 based on information (e.g., display size, display resolution, etc.) about the display (i.e., in display subsystem 108) on portable electronic device 100, which may be sent as part of the request for mirrored content stream 802. Mirrored content stream 802 is then transmitted by fixed display system 200 through LAN 402 to portable electronic device 100. Then, at step 512, the synchronized mirrored instance of content stream 602 is displayed on portable electronic device 100.

Note that in some embodiments, as discussed above, fixed display subsystem 208 may be implemented in a physically separate device from other subsystems of fixed display system 200. In these embodiments, fixed display subsystem 208 may be coupled to the other subsystems of fixed display system 200 using a cable or other connection (e.g., HDMI cable, USB cable, etc.), while mirrored content stream 802 may be transmitted from fixed display system 200 through LAN 402 (e.g., using an IEEE 802.11 standard) to portable electronic device 100. For example, in some of these embodiments, fixed display system 200 may include an Apple TV device coupled to a television using an HDMI cable. The Apple TV device may be wirelessly connected to LAN 402 through a Wi-Fi networking system in its networking subsystem, and it may be connected to the television over the HDMI cable through an HDMI receptacle in the Apple TV device. When content stream 602 is received wirelessly by the Apple TV device across LAN 402, it is converted into a format for output to the television and sent to the television over the HDMI cable. Additionally, the Apple TV device generates mirrored content stream 802 based on content stream 602 and wirelessly transmits mirrored content stream 802 using the Wi-Fi networking system across LAN 402 to portable electronic device 100.

Figure 9:
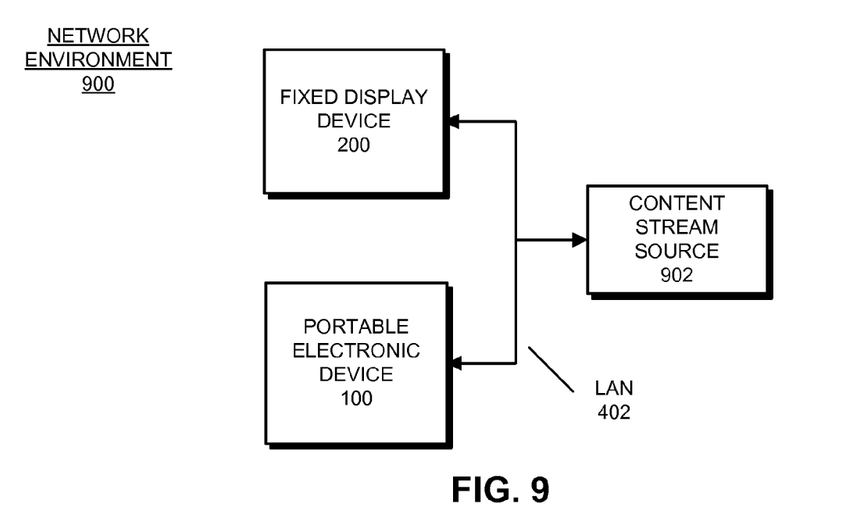
FIG. 9 presents a block diagram illustrating a network environment including a content stream source communicating on a local area network in accordance with described embodiments.

FIGS. 9-12 depict another embodiment in accordance with the process described in FIG. 5. FIG. 9 presents a block diagram illustrating network environment 900 including portable electronic device 100, fixed display system 200 and content stream source 902 all communicating on LAN 402.

Content stream source 902 may be any source of content that can stream content to fixed display system 200 using LAN 402. For example, content stream source 902 may include, but is not limited to, a network-enabled DVD player, a network-enabled game console, a network-enabled DVR, a network-enabled set-top box, a network-enabled server (e.g., a media server), a network-enabled computer (e.g., desktop, laptop, or subnotebook/netbook), or any other network-enabled device that can stream content to a fixed display system.

Figure 10:
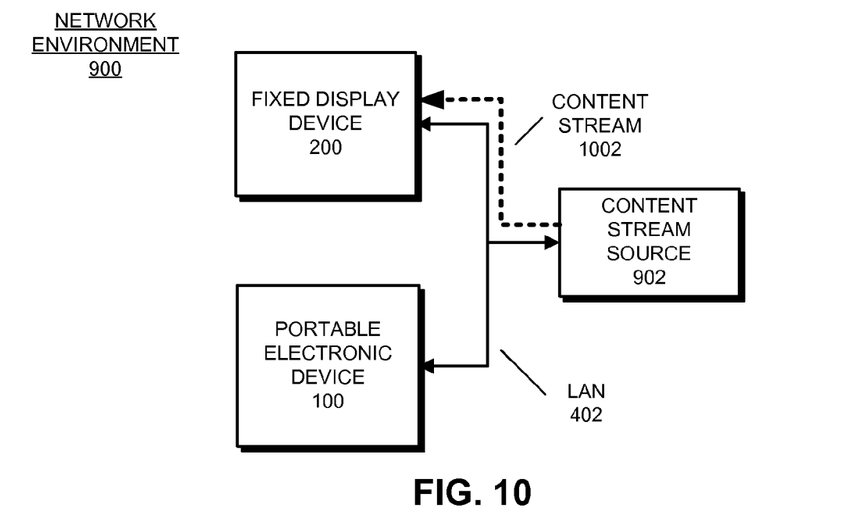
FIG. 10 presents a block diagram illustrating a network environment depicting a content stream from a content stream source through a LAN to a fixed display system in accordance with described embodiments.

FIG. 10 presents a block diagram illustrating network environment 900 with content stream 1002 streaming from content stream source 902 through LAN 402 to fixed display system 200 in accordance with described embodiments. For example, content stream source 902 may be a media server streaming a movie (content stream 1002) to an Apple TV device attached to a flat screen TV (combined to comprise fixed display system 200). Then, when a user viewing the content stream on fixed display system 200 desires to leave the viewing area, the user selects content stream 1002 on portable electronic device 100. As discussed above, portable electronic device 100 may be made aware of the available content streams using any desired method including a service discovery protocol. In some embodiments, the service discovery protocol may continually alert portable electronic device 100 to the available content streams, and in some embodiments, the service discovery protocol may allow portable electronic device 100 to query for available content streams.

When content stream 1002 is selected, portable electronic device 100 receives the selection (step 502). Portable electronic device 100 then determines if it is compatible with content stream 1002 and therefore can receive and display a synchronized content stream from content stream source 902 (step 504). If portable electronic device 100 determines that it is compatible, then it requests a synchronized instance of the content stream (step 506) as displayed in FIG. 11 and displays the synchronized instance of the content stream on portable electronic device 100.

Figure 11:
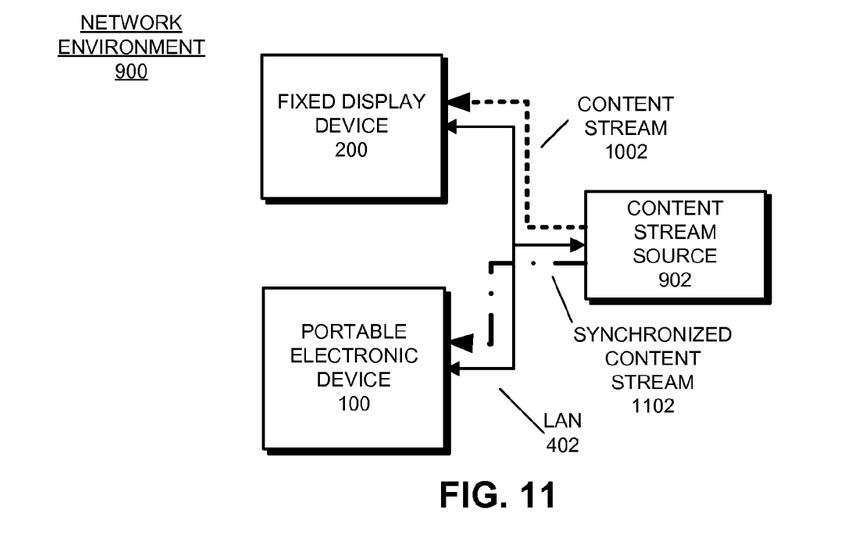
FIG. 11 presents a block diagram illustrating a network environment depicting a content stream and a synchronized content stream, each streaming from a content stream source through a local area network to, respectively, a fixed display system and a portable electronic device in accordance with described embodiments.

FIG. 11 presents a block diagram illustrating network environment 900 depicting content stream 1002 and synchronized content stream 1102, each streaming from content stream source 902 through LAN 402 to, respectively, fixed display system 200 and portable electronic device 100 in accordance with described embodiments. Note that, as discussed above, portable electronic device 100 may attempt to synchronize synchronized content stream 1102 with content stream 1002 even after synchronized content stream 1102 begins streaming. In some embodiments, portable electronic device 100 may periodically synchronize synchronized content stream 1102 with content stream 1002 using information received from fixed display system 200 as part of the service discovery protocol. Furthermore, in some embodiments, content stream source 902 may synchronize synchronized content stream 1102 and content stream 1002 as they are generated and streamed so that, for example, if content stream 1002 is paused or rewound, then synchronized content stream 1102 will maintain its synchronization at the source (i.e., content stream source 902). For example, in some embodiments, synchronized content stream 1102 may be generated by duplicating content stream 1002 in content stream source 902.

Figure 12:
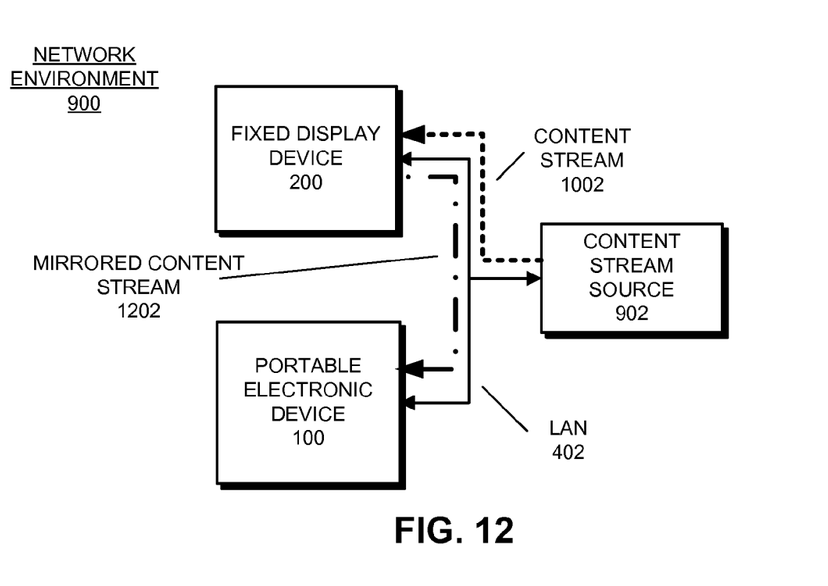
FIG. 12 presents a block diagram illustrating a network environment depicting a content stream streaming from a content stream source through a local area network to a fixed display system and synchronized mirrored content stream streaming from the fixed display system to the portable electronic device through the local area network in accordance with described embodiments.

If portable electronic device 100 is not compatible with content stream 1002 as streamed from content stream source 902 (step 504), then as discussed above, portable electronic device 100 requests a synchronized instance of streaming content based on mirroring fixed display system 200 (step 510). Fixed display system 200 generates the synchronized instance of content stream 1002 for display on portable electronic device 100 based on mirroring fixed display system 200, and portable electronic device 100 displays the synchronized mirrored instance of the content stream (step 512). FIG. 12 presents a block diagram illustrating network environment 900 depicting content stream 1002 streaming from content stream source 902 through LAN 402 to fixed display system 200 and synchronized mirrored content stream 1202 streaming from fixed display system 200 to portable electronic device 100 through LAN 402.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for displaying a synchronized instance of streaming content on a portable electronic device, comprising: receiving, at the portable electronic device via a wireless local area network, a selection of streaming content that is being displayed on a fixed display system; determining, at the portable electronic device, if the portable electronic device is compatible with the streaming content being displayed on the fixed display system, wherein determining if the portable electronic device is compatible with the streaming content comprises, when it is determined that the portable electronic device does not have compatibility requirements for determining compatibility, acquiring compatibility requirements from the fixed display system; and if the portable electronic device is compatible with the streaming content being displayed on the fixed display system, then, at the portable electronic device: requesting, from a content source, the synchronized instance of the streaming content for display on the portable electronic device; receiving, from the content source, the synchronized instance of the streaming content; and displaying the synchronized instance of the streaming content on the portable electronic device.

2. The method of claim 1, wherein if the portable electronic device is not compatible with the streaming content being displayed on the fixed display system, then the method further includes: requesting, on the portable electronic device, the synchronized instance of the streaming content for display on the portable electronic device based on mirroring the fixed display system; and displaying the synchronized instance of the streaming content on the portable electronic device.

3. The method of claim 1, wherein before receiving the selection the method includes: displaying, on the portable electronic device, information related to the streaming content being displayed on the fixed display system, and the streaming content is streamed to the fixed display system using the wireless local area network.

4. The method of claim 1, wherein the wireless local area network is based on IEEE 802.11 technology.

5. The method of claim 1, wherein determining if the portable electronic device is compatible with the streaming content being displayed on the fixed display system includes: determining if the portable electronic device includes an application used to display the streaming content on the fixed display system.

6. The method of claim 1, wherein displaying the synchronized instance of the streaming content on the portable electronic device includes determining a synchronization mismatch between the streaming content that is being displayed on the fixed display system and the synchronized instance of the streaming content being displayed on the portable electronic device.

7. The method of claim 1, wherein the fixed display system includes a television.

8. The method of claim 2, wherein in response to requesting, on the portable electronic device, the synchronized instance of the streaming content for display on the portable electronic device based on mirroring the fixed display system, the method further includes: receiving, on the portable electronic device, the synchronized instance of the streaming content from the fixed display system using the wireless local area network.

9. A non-transitory computer-readable storage medium containing instructions that, when executed by a processing subsystem in a portable electronic device, cause the portable electronic device to perform a method for displaying a synchronized instance of streaming content on the portable electronic device, the method comprising: receiving, on the portable electronic device, a selection of streaming content that is being displayed on a fixed display system; determining if the portable electronic device is compatible with the streaming content being displayed on the fixed display system, wherein determining if the portable electronic device is compatible with the streaming content comprises, when it is determined that the portable electronic device does not have compatibility requirements for determining compatibility, acquiring compatibility requirements from the fixed display system; and if the portable electronic device is compatible with the streaming content being displayed on the fixed display system then, on the portable electronic device,
  requesting, from a content source, the synchronized instance of the streaming content for display on the portable electronic device; and
  displaying the synchronized instance of the streaming content on the portable electronic device.

10. The non-transitory computer-readable storage medium of claim 9, wherein if the portable electronic device is not compatible with the streaming content being displayed on the fixed display system, then the method further includes:
  requesting, on the portable electronic device, the synchronized instance of the streaming content for display on the portable electronic device based on mirroring the fixed display system and displaying the synchronized instance of the streaming content on the portable electronic device.

11. The non-transitory computer-readable storage medium of claim 9, wherein before receiving the selection the method includes: displaying, on the portable electronic device, information related to the streaming content being displayed on the fixed display system, wherein the portable electronic device is coupled to a local area network, and the streaming content is streamed to the fixed display system using the local area network.

12. The non-transitory computer-readable storage medium of claim 9, further including:
  in response to requesting the synchronized instance of the streaming content for display on the portable electronic device, receiving the synchronized instance of the streaming content for display on the portable electronic device over a wireless network, wherein the wireless network comprises a network using an IEEE 802.11 standard.

13. The non-transitory computer-readable storage medium of claim 9, wherein displaying the synchronized instance of the streaming content on the portable electronic device includes determining a synchronization mismatch between the streaming content that is being displayed on the fixed display system and the synchronized instance of the streaming content being displayed on the portable electronic device.

14. The non-transitory computer-readable storage medium of claim 10, wherein in response to requesting, on the portable electronic device, the synchronized instance of the streaming content for display on the portable electronic device based on mirroring the fixed display system, the method further includes:
  receiving, on the portable electronic device, the synchronized instance of the streaming content from the fixed display system using a local area network.

15. A method for use in a fixed display system, comprising:
  in the fixed display system, performing operations for:
    receiving streaming content;
    generating, based on the streaming content, display data for display on a display screen; receiving a query from a portable electronic device, the query requesting compatibility requirements for displaying the streaming content on the portable electronic device;
    returning a response to the portable electronic device that comprises the compatibility requirements;
    receiving a request from the portable electronic device for a synchronized instance of the streaming content for display on the portable electronic device;
    generating the synchronized instance of the streaming content for display on the portable electronic device; and
    transmitting the synchronized instance of the streaming content to the portable electronic device for display on the portable electronic device.

16. The method of claim 15, wherein the transmitting the synchronized instance of the streaming content to the portable electronic device includes:
  transmitting the synchronized instance of the streaming content from the fixed display system to the portable electronic device using a local area network.

17. The method of claim 15, wherein the fixed display system and the portable electronic device are coupled to a local area network, and wherein the method comprises:
  before receiving the request from the portable electronic device, transmitting information to the portable electronic device that is related to the streaming content.

18. The method of claim 15, wherein transmitting information to the portable electronic device that is related to the streaming content includes:
  transmitting information related to at least one of:
  an application used to display the streaming content on the fixed display system; and
  an identifier for the streaming content.

19. The method of claim 15, wherein generating the synchronized instance of the streaming content for display on the portable electronic device includes generating the synchronized instance based on information related to a display in the portable electronic device.

20. The method of claim 15, wherein the fixed display system is a television or monitor, and wherein the display screen is included within the fixed display system.

21. The method of claim 15, wherein the fixed display system is a set-top box, video game console, digital video disk (DVD) player, or Digital Video Recorder (DVR).

22. A portable electronic device for displaying a synchronized instance of streaming content, comprising: a display subsystem; and a processing subsystem coupled to the display subsystem, wherein the processing subsystem performs one or more operations for:
receiving a selection of streaming content that is being displayed on a fixed display system; determining if the portable electronic device is compatible with the streaming content being displayed by the fixed display system, wherein determining if the portable electronic device is compatible with the streaming content comprises, when it is determined that the portable electronic device does not have compatibility requirements for determining compatibility, acquiring compatibility requirements from the fixed display system; and
when the portable electronic device is compatible with the streaming content being displayed on the fixed display system,
requesting, from a content source, the synchronized instance of the streaming content; and
displaying the synchronized instance of the streaming content using the display subsystem.

23. The portable electronic device of claim 22, wherein, when the portable electronic device is not compatible with the streaming content being displayed on the fixed display system, the processing subsystem performs one or more operations for:
requesting, from the fixed display system, the synchronized instance of the streaming content for display based on mirroring the streaming content being displayed on the fixed display system; and
displaying the synchronized instance of the streaming content using the display subsystem.

24. The portable electronic device of claim 22, wherein, when determining if the portable electronic device is compatible with the streaming content being displayed on the fixed display system, the processing subsystem performs one or more operations for:
determining if the portable electronic device includes an application used to display the streaming content on the fixed display system.

25. The portable electronic device of claim 22, wherein, when displaying the synchronized instance of the streaming content using the display subsystem, the processing subsystem performs one or more operations for:
determining a synchronization mismatch between the streaming content that is being displayed on the fixed display system and the synchronized instance of the streaming content being displayed using the display subsystem.

26. The portable electronic device of claim 23, wherein, responsive to requesting, from the fixed display system, the synchronized instance of the streaming content for display, the processing subsystem performs one or more operations for: receiving the synchronized instance of the streaming content from the fixed display system using a local area network.

* * * * *